(12) United States Patent
Morrill et al.

(10) Patent No.: US 7,490,300 B2
(45) Date of Patent: Feb. 10, 2009

(54) COPYING AND UPDATING FILES

(75) Inventors: Jason F Morrill, Redmond, WA (US); Josef N Larsson, Des Moines, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/202,999

(22) Filed: Aug. 12, 2005

(65) Prior Publication Data

US 2007/0038688 A1   Feb. 15, 2007

(51) Int. Cl.
*G06F 3/048* (2006.01)

(52) U.S. Cl. .................. 715/810; 715/808; 715/809; 715/817; 715/828

(58) Field of Classification Search .......... 715/808–810
See application file for complete search history.

(56) References Cited

U.S. PATENT DOCUMENTS 5,664,133 A * 9/1997 Malamud et al. ............ 715/816
2006/0206511 A1* 9/2006 Picon et al. ................. 707/102

FOREIGN PATENT DOCUMENTS

| EP | 0 564 548 B1 | 9/1997 |
|----|--------------|--------|
| EP | 1 453 278 A2 | 9/2004 |
| WO | WO 01/95155 A2 | 12/2001 |

OTHER PUBLICATIONS

Microsoft Windows XP, Operating System SP2, Screenshots, Fig 1-4, Aug. 25, 2004.*
How to obtain the latest windows XP service pack, http://support.microsoft.com/kb/322389, Nov. 5, 2007, pp. 1-3.*
Buyens, Jim, Microsoft Office FrontPage 2003 Inside Out, 2004, Microsoft Press, Chp 16-17.*

* cited by examiner

*Primary Examiner*—William L Bashore
*Assistant Examiner*—Ashraf Zahr
(74) *Attorney, Agent, or Firm*—Merchant & Gould P.C.

(57) ABSTRACT

Copied and source files are tracked so that authors of these documents can selectively update these files. Stale copied files can be eliminated. A control is provided to mediate copying of files among servers that have differing security policies. Metadata of a file being copied is downloaded from a server to the control and the control uploads the metadata of the file to one or more servers. A relationship between copied files and source files are memorialized whether or not copied files reside in different namespaces from the namespace of the source files.

6 Claims, 11 Drawing Sheets

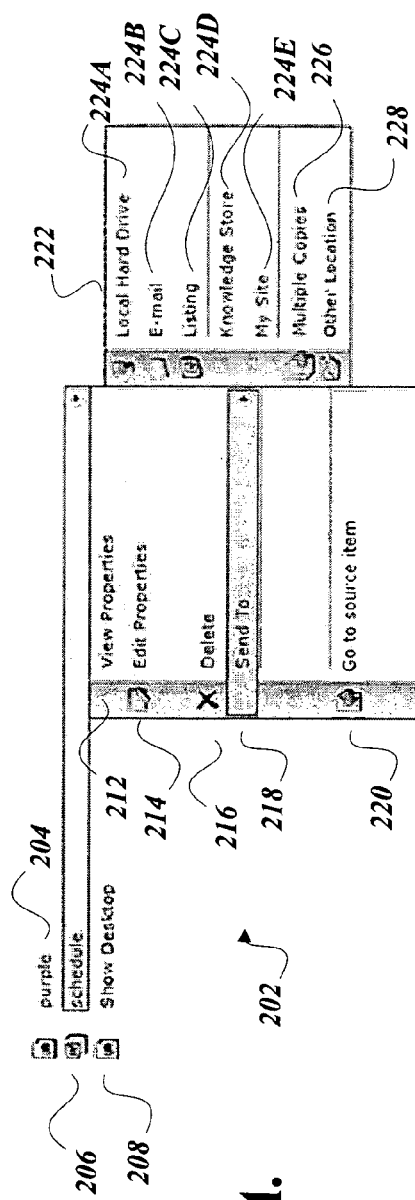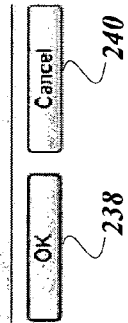
Fig.2A.
Fig.2B.

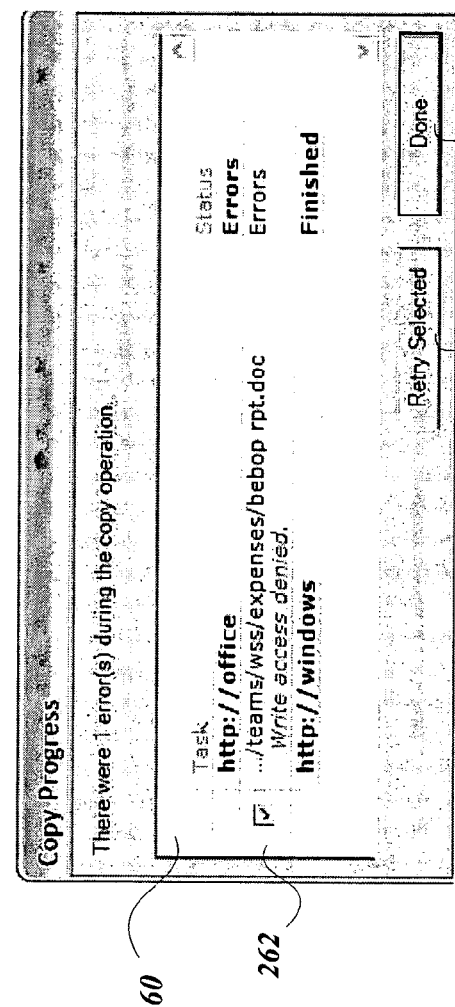

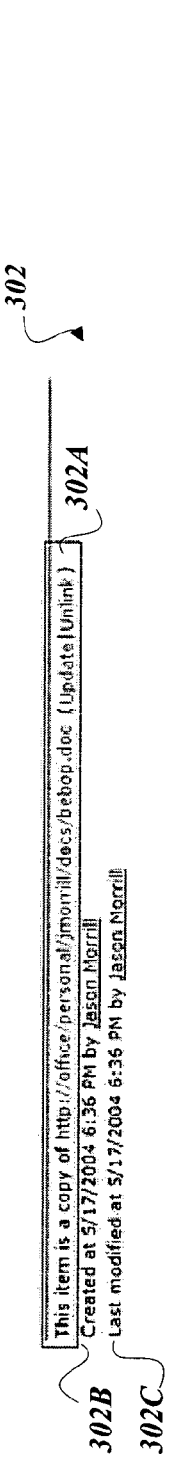
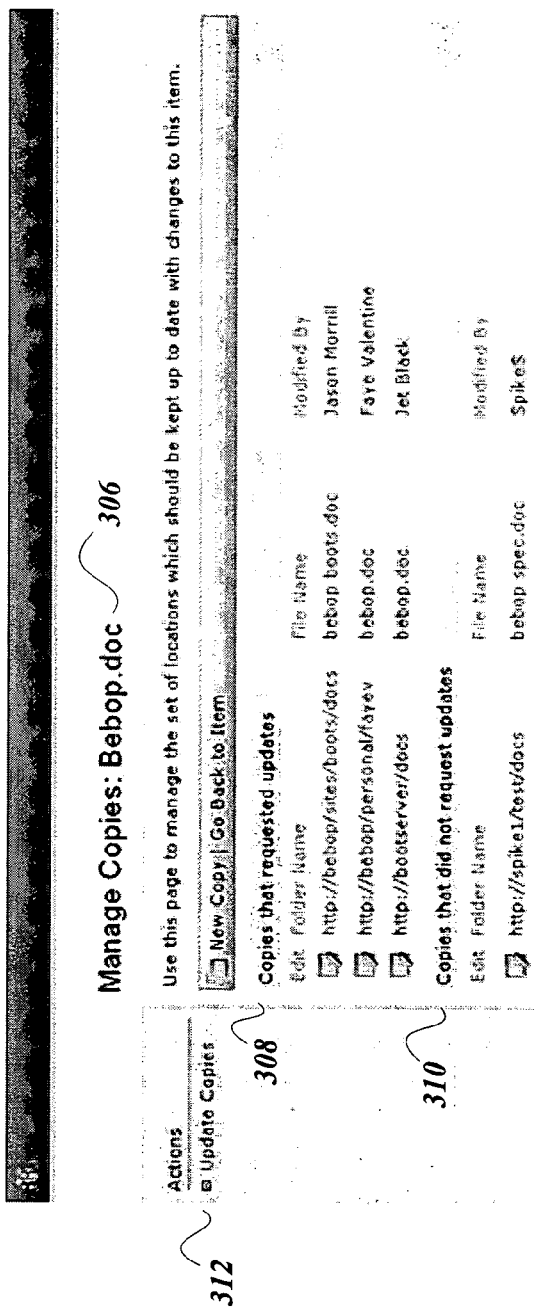
Fig.3A.
Fig.3B.

COPYING AND UPDATING FILES

FIELD OF THE INVENTION

The present invention generally relates to software.

BACKGROUND

A file is a complete, named collection of information, such as program, a set of data used by a program, or a user-created document. Files are typically structured into folders residing on computer disk drives. Files and folders are generally organized in a hierarchical namespace and provide users and applications with a consistent and efficient way to access and manage these files and folders. A namespace can be viewed as a single tree-structured hierarchy. To access a namespace file, the file must first be identified. One way to identify a file is to use a path, which is a route followed by the operating system through the directories in finding, sorting, and retrieving files on a disk. For example, an object may have a name, such as "MyFile.htm." Because there might be other files with that name elsewhere in the namespace, the file can be uniquely identified by using an address, such as "C./MyDocs/MyFile.htm" or "http://MyDocs/MyFile.htm".

Suppose a source file "MyFile.htm" at the address "http://MyDocs/" needs to also appear at another address, such as "http://HisDocs/" Conventionally, the source file "MyFile.htm" would be copied from the address "http://MyDocs/" and pasted to the address "http://HisDocs/" The copied file then has no further relationship to the source file. If changes were to be made to the source file, the copied file cannot be updated because of the lack of ongoing relationship between the source file and the copied file. Conventional copying works fine if all that is wanted is a static file. The problem arises when a static file is not desired, but instead, a dynamic file that can be updated or can inform appropriate users of the copied file of changes.

One conventional technique to add dynamism to copied files is the use of symbolic links, which are area directory entries that take the place of directory entries of a copied file but are actually references to source files in different directories. Thus, using a symbolic link, the copied file "MyFile.htm" at the address "http://HisDocs/" actually references the file "MyFile.htm" at the address "http://MyDocs/" This works very well if a single namespace exists containing the addresses to both the source file and the copied file. But in cases where the source file may reside in a namespace that is different from the namespace containing the copied file, the use of symbolic links will not work.

SUMMARY

In accordance with this invention, a computer-readable medium, system, and method for copying and updating files is provided. The system form of the invention includes a networked system that comprises a first server with a first security policy containing a file at a first address. The networked system further comprises a browser that displays options selectable to reproduce the file at the first address as a copy of the file at a second address within the server with the first security policy. The options includes an option to update the copy of the file automatically when the file has been changed. The networked system further comprises a second server with a second security policy different from the first security policy of the first server. The networked system further comprises a control that facilitates the reproduction of the file as another copy on the second server.

In accordance with further aspects of this invention, a computer-readable medium form of the invention includes a computer-readable medium having one or more data structures stored thereon for tracking copies of a file. The computer-readable medium comprises a destinations field that stores a pointer to a destination data structure that contains addresses of the copies of the file, a version field that stores a version of the file, and a source field that contains an address of another file from which the file was copied. The destination data structure includes one or more copy destination tags that contain addresses of copies of the file. The addresses include Web addresses. The destination data structure includes an attribute that specifies whether a copy is to be updated when the file has been changed and another attribute that specifies an alias of a user who creates the copy.

In accordance with further aspects of this invention, a method form of the invention includes a computer-implemented method for copying files. The method comprises receiving events that indicate an act of hovering a pointer over a file to invoke a context menu, which displays an option to send a copy of the file to an address and another option to go to the source of the file. The method further comprises displaying a fly-out menu when the option to send the copy of the file to an address is selected, the fly-out menu displaying three categories of menu items that are selected from a group consisting of copying to suggested destinations, upgrading copies, and specifying new locations.

The method comprises presenting a first window when the menu item for specifying new locations is selected. The first window provides a first text box adapted to receive an address, a second text box adapted to receive a name for the copy, an indication of whether the copy is to receive updates, and another indication of whether an alert is sent when an update is available. The method comprises presenting a second window when the menu item for upgrading copies is selected. The second window provides click boxes for each copy of the file for a particular address, the click boxes being selectable to indicate that an upgrade is to be sent. The method comprises. presenting a third window that lists namespaces and addresses under the namespaces where copies of the file will be reproduced. The third window includes a button that is selectable to indicate that copying shall proceed and another button that is selectable to terminate the copying. The method comprises presenting a fourth window that lists namespaces and addresses under the namespaces where attempts have been tried to reproduce the copies of the file, the window indicating whether the copying at each address terminates successfully or terminates in failure. The fourth window includes a button that is selectable to indicate that copying shall be attempted again for copying that terminates in failure. The method comprises presenting a text box that indicates that a file is a copy of another file. The text box further indicates an address of the another file. The text box further presents an upgrade link that is selectable to upgrade copies of the another file. The method comprises presenting a window that displays copies that requested updates and copies that did not request updates.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2A is a pictorial diagram illustrating an exemplary user interface in which a copy operation is specified;

FIG. 2B is a pictorial diagram illustrating an exemplary user interface by which a user specifies a destination to deposit a copy of a source file and whether the copied file can be updated;

FIG. 2E is a pictorial diagram illustrating an exemplary user interface for reporting copying errors;

FIG. 2F is a pictorial diagram illustrating an exemplary user interface for reporting copying errors;

FIG. 3A is a pictorial diagram illustrating an exemplary user interface for indicating the source file from which the copied file was copied;

FIG. 3B is a pictorial diagram illustrating an exemplary user interface for managing copied files;

DETAILED DESCRIPTION

Figure 1:
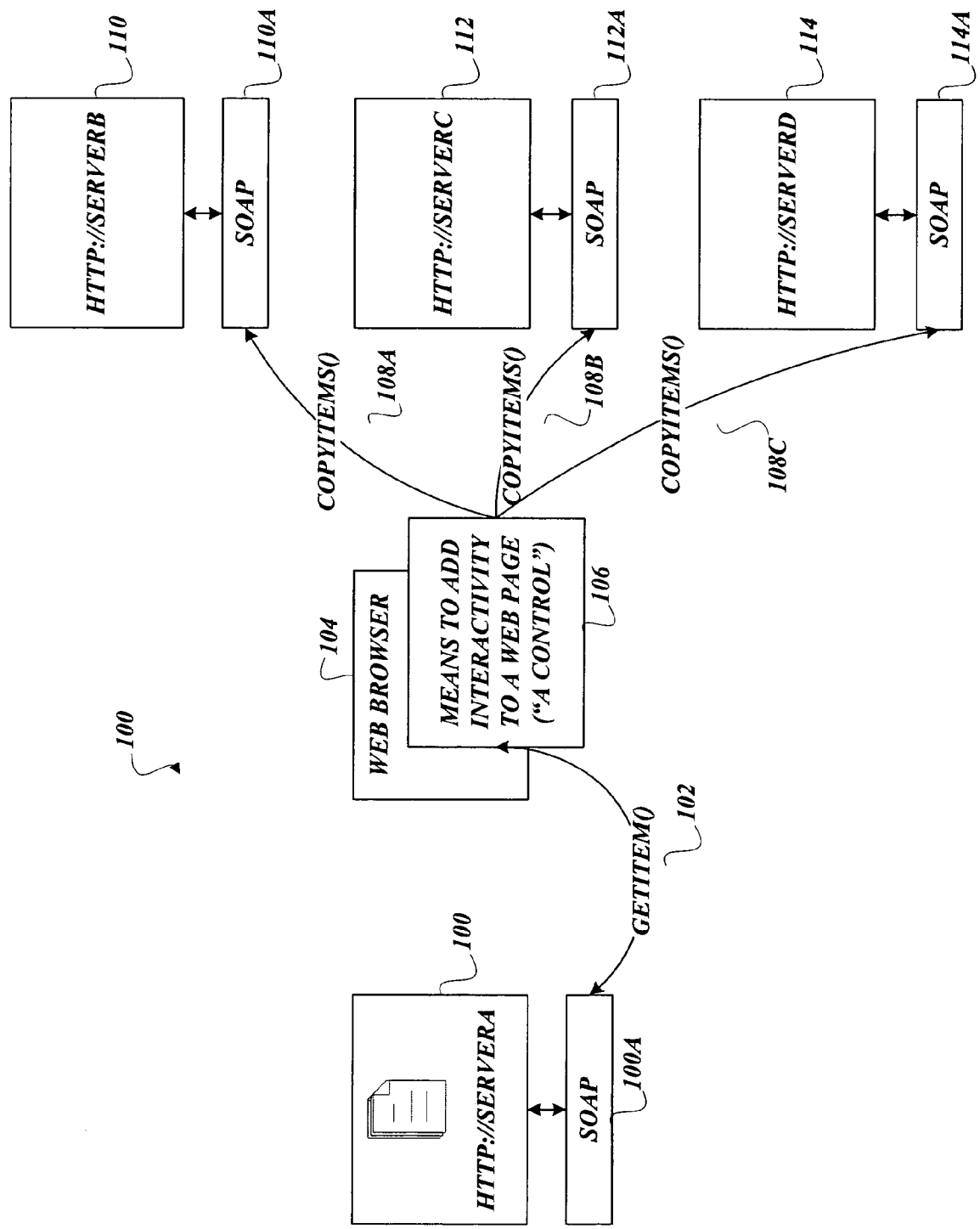
FIG. 1 is a block diagram illustrating an exemplary system for copying files and creating relationships between source files and copied files.

FIG. 1 illustrates a system 100 that includes servers 100-114. On the Internet or other network, these servers 100-114 are computers or programs that respond to commands from clients. For example, a file server may contain an archive of data or program files; when a client submits a request for a file, the server transfers a copy of the file to the client.

The server 100 is located at address "http://ServerA". The server 110 is located at address "http://ServerB". The server 112 is located at address "http://ServerC". The server 114 is located at address "http://ServerD". SOAP layers 100A-114A are coupled to servers 100-114, respectively. These SOAP layers 110A-114A use a simple; customizable, tag-based protocol for exchanging structured and typed information on the Web. A Web browser 104 is a piece of software that lets a user view tagged documents and gain access to files and software related to those documents. Originally developed to allow users to view browsable documents on the World Wide Web, Web browsers can blur the distinction between local and remote resources for the user by also providing access to documents on a network, the Internet, or a local hard drive. The Web browser 104 is built on the concept of hyperlinks, which allow users to point and click with a mouse in order to jump from document to document in whatever order they desire. Most Web browsers are also capable of downloading and transferring files, displaying graphics embedded in the document, playing audio and video files associated with a document, and executing small programs, such as Java applets or ActiveX controls included by programmers in the documents.

The system 100 also includes means 106 to add interactivity to a Web page ("a control 106"). Many suitable implementations of the control 106 are possible. One suitable implementation includes an ActiveX control. Various embodiments of the present invention use the Web browser 104 or the control 106 to facilitate copying a file from one address to another address. These addresses can be under one namespace, such as the namespace of the server 100, or multiple namespaces, such as those namespaces organized under servers 100-114. If a copy operation were to be performed in a single namespace, such as the namespace of the server 100, either the Web browser 104 or the control 106 can be used to make desired copies. If a copy operation were to be performed to reproduce a file from one namespace to one or more other namespaces, it is preferred that the control 106 be used to perform such a transfer and avoid security problems. The control 106 can mediate between two servers that may have differing security policies. The control 106 can authenticate itself with one server and with another server so as to faciliate the copying and updating processes of a file on one server and a copy of the file on another server.

A GetItem() function 102 is used either by the Web browser 104 or the control 106 to obtain a desired file. CopyItems() functions 108A-108C can be used to reproduce the file obtained by the GetItem() function 102 to other namespaces. Both the GetItem() function 102 and the CopyItems() functions 108A-108C use the SOAP layers 100A-114A to write and read to various namespaces on servers 100-114. Both the Web browser 104 and the control 106 are preferably executed on a client, such as a personal computer, that communicates and intermediates between the server 100 and servers 110-114.

FIG. 2A illustrates a collection of user interface elements 202. The collection of user interface elements 202 includes another collection of user interface elements 204 that includes an icon and a textual element "purple". Another collection of user interface elements 208 includes an icon and a textual element "Show Desktop". A collection of user interface elements 266 includes an icon and a textual element "Schedule" from which a context menu 210 is invoked. The menu 210 includes menu item 212 "View Properties" which can be selected to view the properties of a file named by the textual element "Schedule". A menu item 214 "Edit Properties" can be selected to edit the properties of the file named by the textual element "Schedule". The file named by the textual element "Schedule" can be deleted by selecting menu item 216 "Delete". If the file named by the textual element "Schedule" is a copy of another file, menu item 220 "Go to the source item" can be selected so that the source file from which the copied file named by the textual element "Schedule" can be found.

If a copy operation or an update operation were to be performed on the file named by the textual element "Schedule", menu item 218 "Send To" is selected to cause a menu 222 to fly out. Menu item 224A "Local Hard Drive"; menu item 224B "E-mail"; menu item 224C "Listing"; menu item 224D "Knowledge Store"; and menu item 224E "My Site" are suggestions of locations where a user may copy the file named by the textual element "Schedule". Menu item 226 can be selected so as to allow a user to specify copies of the file named by the textual element "Schedule" to be updated. Menu item 228 "Other Location" can be selected to bring forth a window 230 (FIG. 2B) to specify an address at which a copy of the file named by the textual element "Schedule" is stored.

As illustrated at FIG. 2B, the window 230 is presented when the user selects menu item 228 "Other Location". The window 230 includes a textual element 232 "Copy:bebop-.doc" indicating that the file named "bebop.doc" is to be copied to a destination specified in panel 234. Within panel 234, a text box 234A appears to allow the user to enter a destination address at which a copy of the file "bebop.doc" will be reproduced. Another text box 234B allows the user to change the name of the copy of the file "bebop.doc". Panel 236 allows the user to select one of two radio buttons 236A (YES/NO) indicating whether the copied file should be updated automatically when a new major version is created. Line 236B contains a click box, which can be selected for an alert to be issued such as a piece of e-mail, when a major version is created, allowing the user to decide whether to update one or more copies of a particular file. An alert can be suitably used when automatic updating is not desired and the user wants to gain control of when the updating should occur after receiving the alert. For example, a person who is responsible for a file and its copies may want to review the update before the update is migrated to all copies of the file. If the user decides to terminate the copy operation, a cancel button 240 can be selected. Otherwise, if the user wishes to proceed with the copy operation, an OK button 238 can be selected.

Figure 2C:
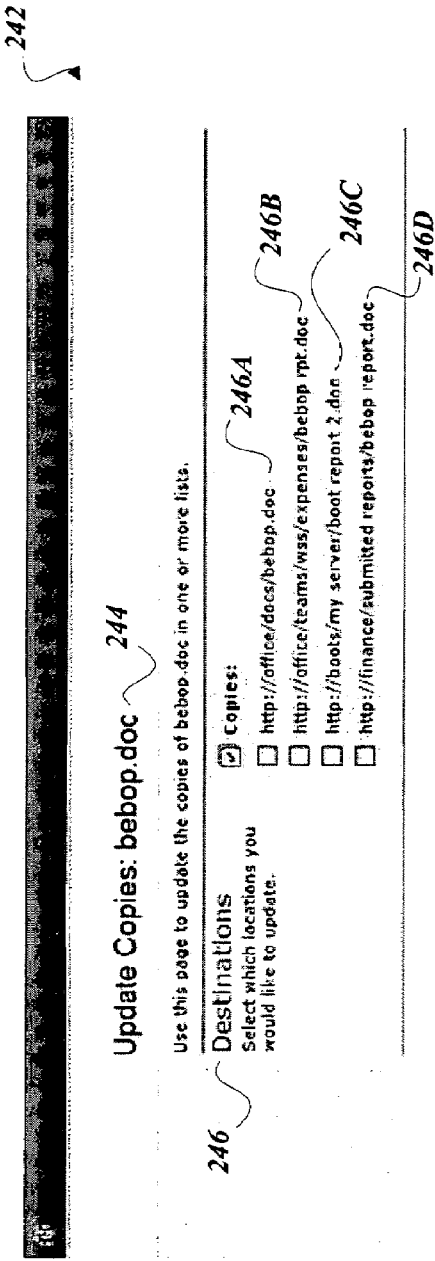
FIG. 2C is a pictorial diagram illustrating an exemplary user interface for indicating copied files to be updated.

FIG. 2C illustrates a window 242 which is invoked when the user selects menu item 226 "Multiple Copies". The window 242 includes the textual element 244 "Update Copies: bebop.doc", indicating that an update operation can be specified to commence to update various copies of the file "bebop.doc". Panel 246 indicates the destination address of various copies of the file "bebop.doc". Addresses 246A-246D have click boxes adjacent to them which the user may select so as to indicate that a particular copy is to be updated.

Figure 2D:
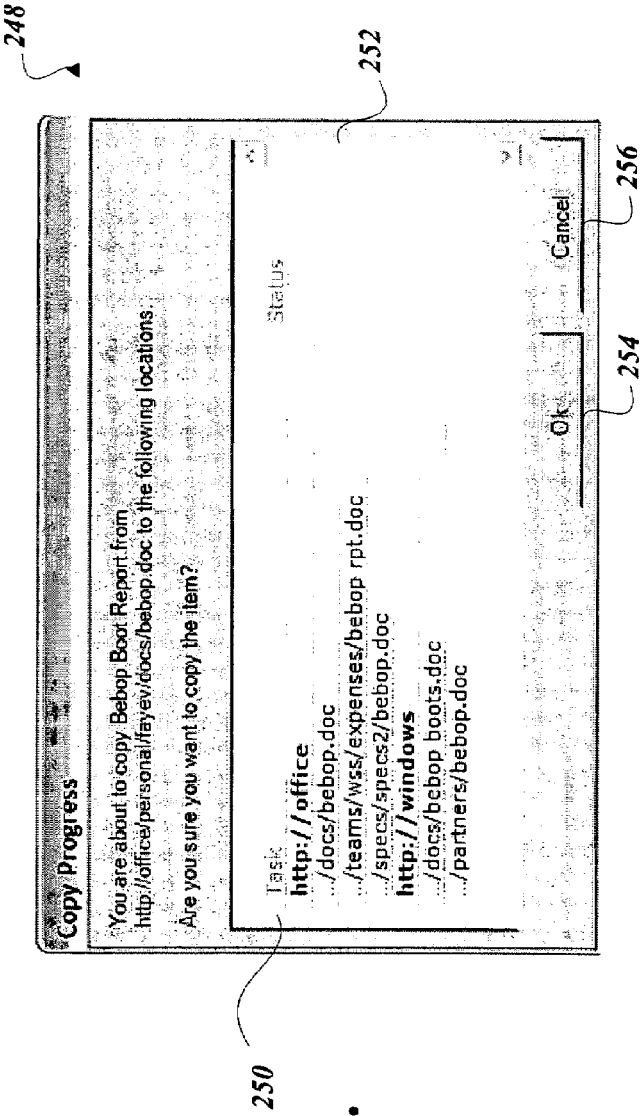
FIG. 2D is a pictorial diagram illustrating a an exemplary user interface showing the progress of copying.

FIG. 2D illustrates a window 248, which informs the user of the progress of the copying operation. A text box 250 indicates various namespaces or servers in bold letters, such as "http://office" or "http://windows". The address under each namespace is then specified to indicate various locations at which the copy of the file will be reproduced. For example, at the following addresses a reproduction of the file "bebop.doc" will occur: ". . . /docs/bebop.doc"; ". . . /teams/wss/expenses/bebop rpt.doc"; and ". . ./specs/specs2/bebop.doc". A scroll bar 252 appears when additional text is available for scrolling so as to allow the user to view the additional text. If the user decides to terminate the copy operation, a cancel button 256 can be selected. Otherwise, if the copy operation is to proceed, the user may select an OK button 254.

FIG. 2E illustrates a window 258 for reporting on the progress of the copy operation. A text box 260 shows the statuses of the success or failure of the copy operation at various namespaces or servers. For example, a copy attempt to the address ". . ./teams/wss/expenses/bebop rpt.doc" under the namespace "http://office" terminated in failure because write access was denied. A click box 262 is selectable by the user so as to indicate destination addresses for the copy operation to retry. Note that the copy operation to the namespace "http://windows" successfully terminated. If the user wishes to retry a failed copy operation, a "Retry Selected" button 264 can be clicked to begin the copy operation process again. The user, alternatively, may also select a Done button 266 to acknowledge the presentation of the window 258 and the statuses of copy operations.

FIG. 2F illustrates a window 268 that includes a textual element 270 "Copy Results:Bebop.doc" indicating various results in copying the file "bebop.doc". Namespaces 272-276 are presented in bold, such as "http://office"; "http://arsenal"; and "http://bebop". Check boxes 272A, 272B can be selected to indicate that the copy operation should be repeated or retried at those destination addresses. Line 272C indicates that the copy operation to destination address ". . . docs/orange/bebop.doc" terminated successfully. Various errors can be reported, such as that write access is denied; the file has been checked out and made unavailable; or that the control 106 must be present in order to copy files from one namespace or server to another namespace or another server.

FIG. 3A illustrates a collection of user interface elements 302 which includes a text element 302A that indicates whether a file is a copy of another file. The textual element 302A indicates the address at which the source file can be found, such as "http://office/personal/jmorrill/docs/bebop.doc". Additionally, contained within the textual element 302A are hyperlinks "Update" and "Unlink" to enable a user to update the copied file or unlink the relationship between the copied file and the source file. Line 302B indicates a date and a time and by whom the copied file was created. Line 302C indicates the date, the time, and the person who last modified the copied file.

FIG. 3B illustrates a window 304 that allows a user to manage copies of a file. A text element 306 "Manage Copies: Bebop.doc" indicates that various copied files in various destination addresses can be managed by the window 304. A panel 308 indicates copies of "bebop.doc" which have requested that whenever changes to the orignal "bebop.doc" are made, the copies be updated. Panel 310 lists copied files or copies of the file "bebop.doc" that have requested not to receive updates. A hyperlink 312 can be selected by the user to cause an update of the file "bebop.doc" to migrate to those copied files that have requested updates.

Figure 4A:
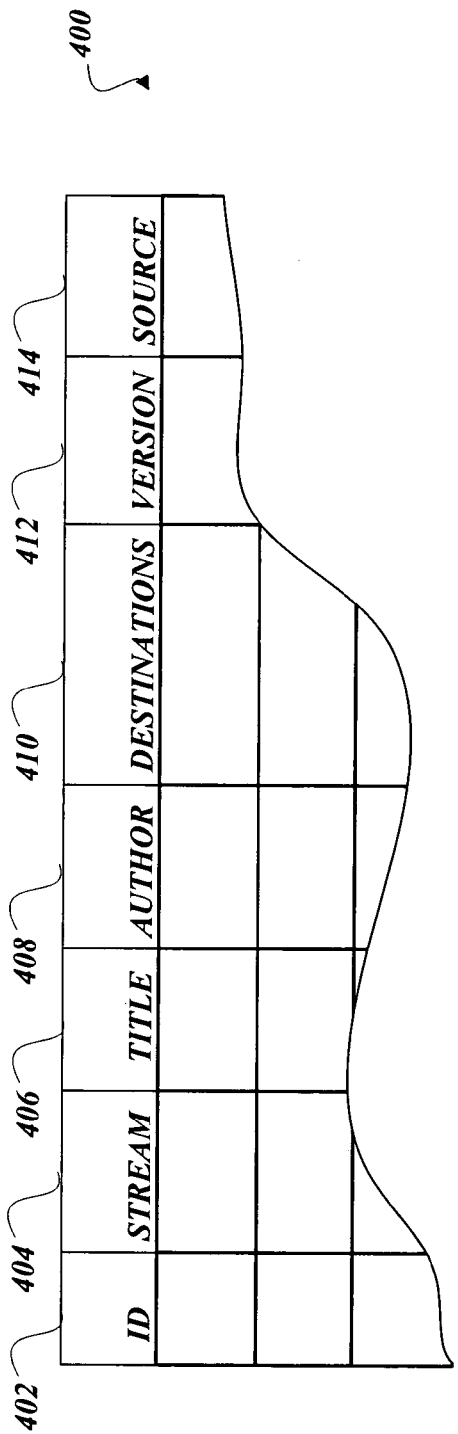
FIG. 4A is a pictorial diagram illustrating a metadata matrix storing information about copied files or the source file.

FIG. 4A illustrates a metadata matrix 400 that contains pieces of metadata connected with various files. When a file is copied, its metadata as described by the matrix 400 is copied and reproduced at the desire destination. The file is represented by a bit stream referenced by stream field 404. An ID field 402 contains identification information connected with various source and copied files. A stream field 404 is the binary content of a file itself. Each file typically has a title and that is described by the title field 406. Each file also has an author and that is described by the author field 408. A destinations field 410 is a pointer to a data structure which is suitably formed by a customizable, tag-based language. The schema of this data structure is described by FIG. 4B. The version field 412 prevents users from overriding a file. Each time a file is updated, the version field 412 is checked to ensure that the version being updated is appropriate. The version field 412 can suitably contain an integer which is incremented whenever an appropriate version has been updated. Suppose that the first user obtains the file with version 1. A second user also obtains the file with version 1. The second user saves the file, hence incrementing the version to version 2. The first user now saves the file, but because the version being saved is an older version (version 1) than the present version of the file (version 2), the save operation terminates unsuccessfully. The matrix 400 also includes a source field 414 for containing an address of the source file from which copied files were made. Any addressing scheme can be used. One suitable addressing scheme includes uniform resource locators.

Figure 4B:
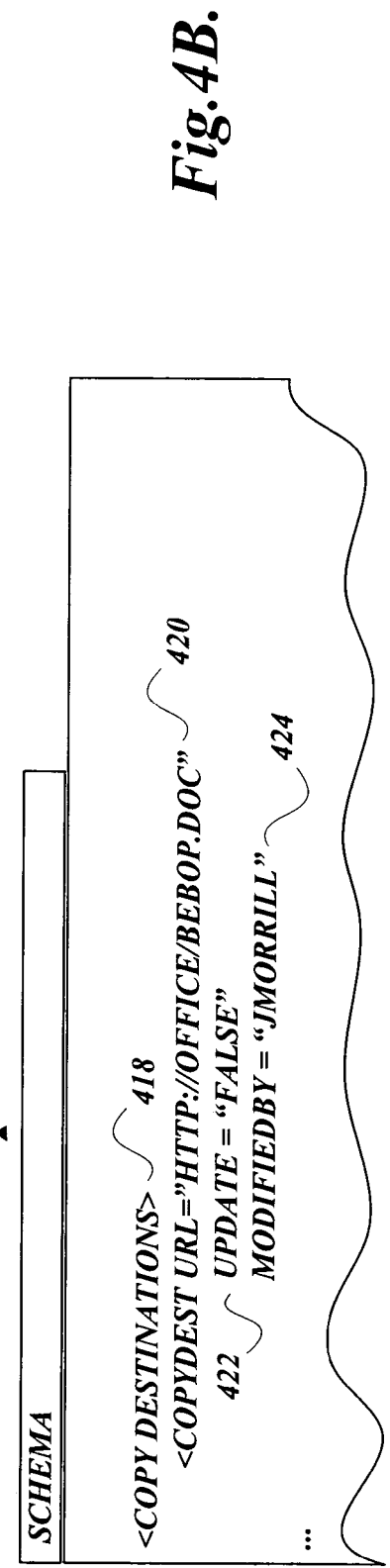
FIG. 4B is a textural diagram illustrating a schema for storing addresses of copied files.
Figure 5A:
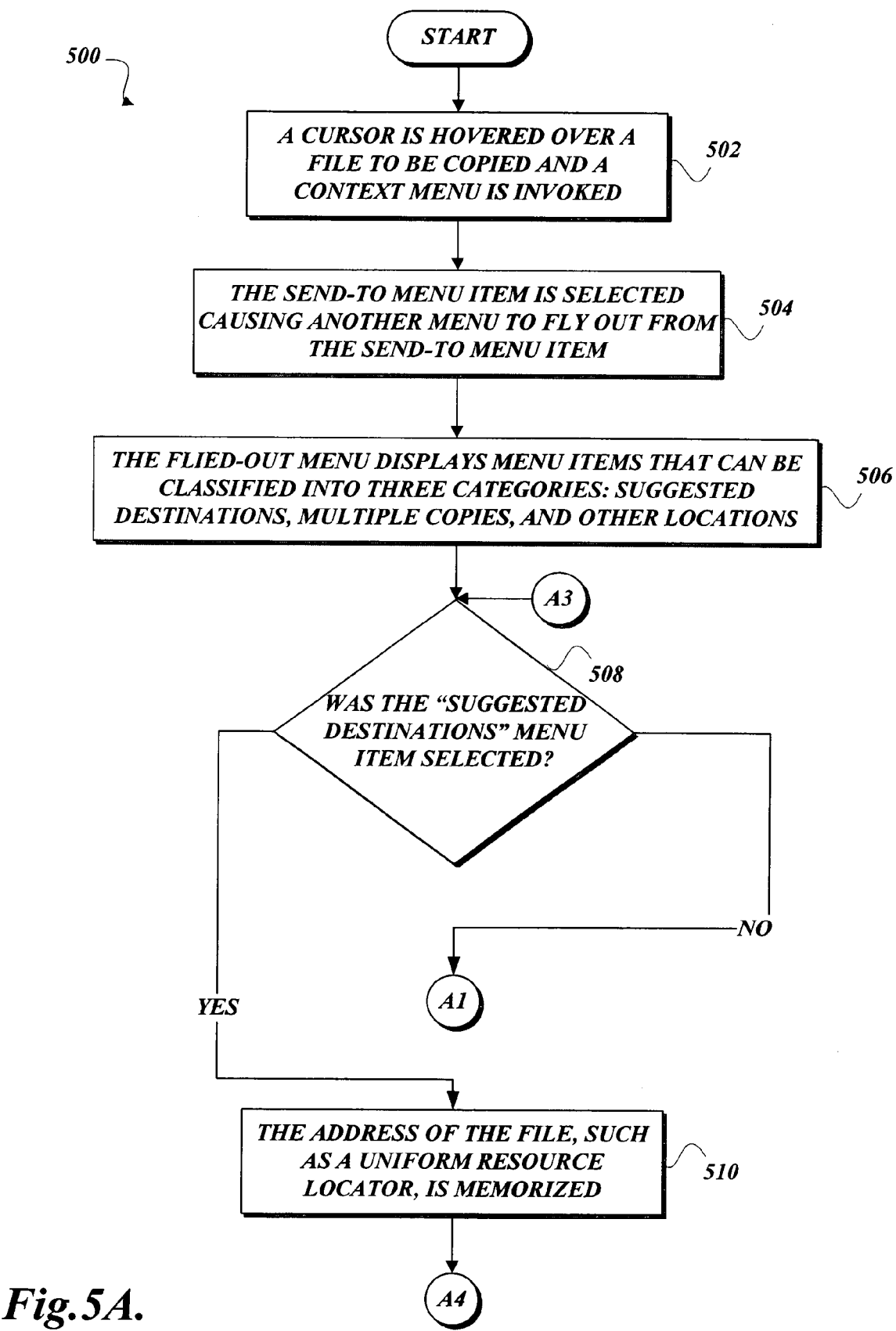
FIGS. 5A-5E are process diagrams illustrating a method for copying files.
Figure 5B:
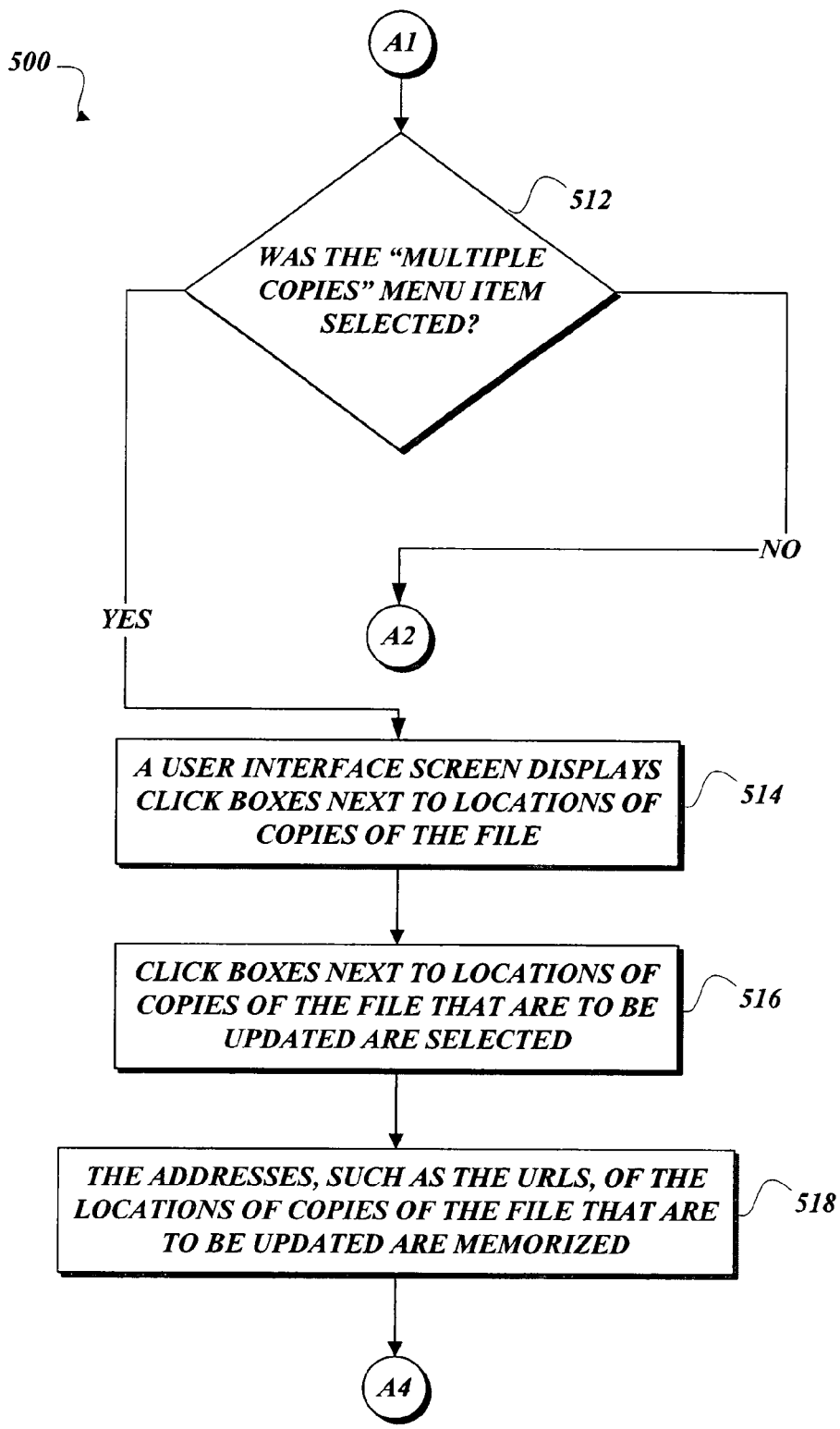
Figure 5C:
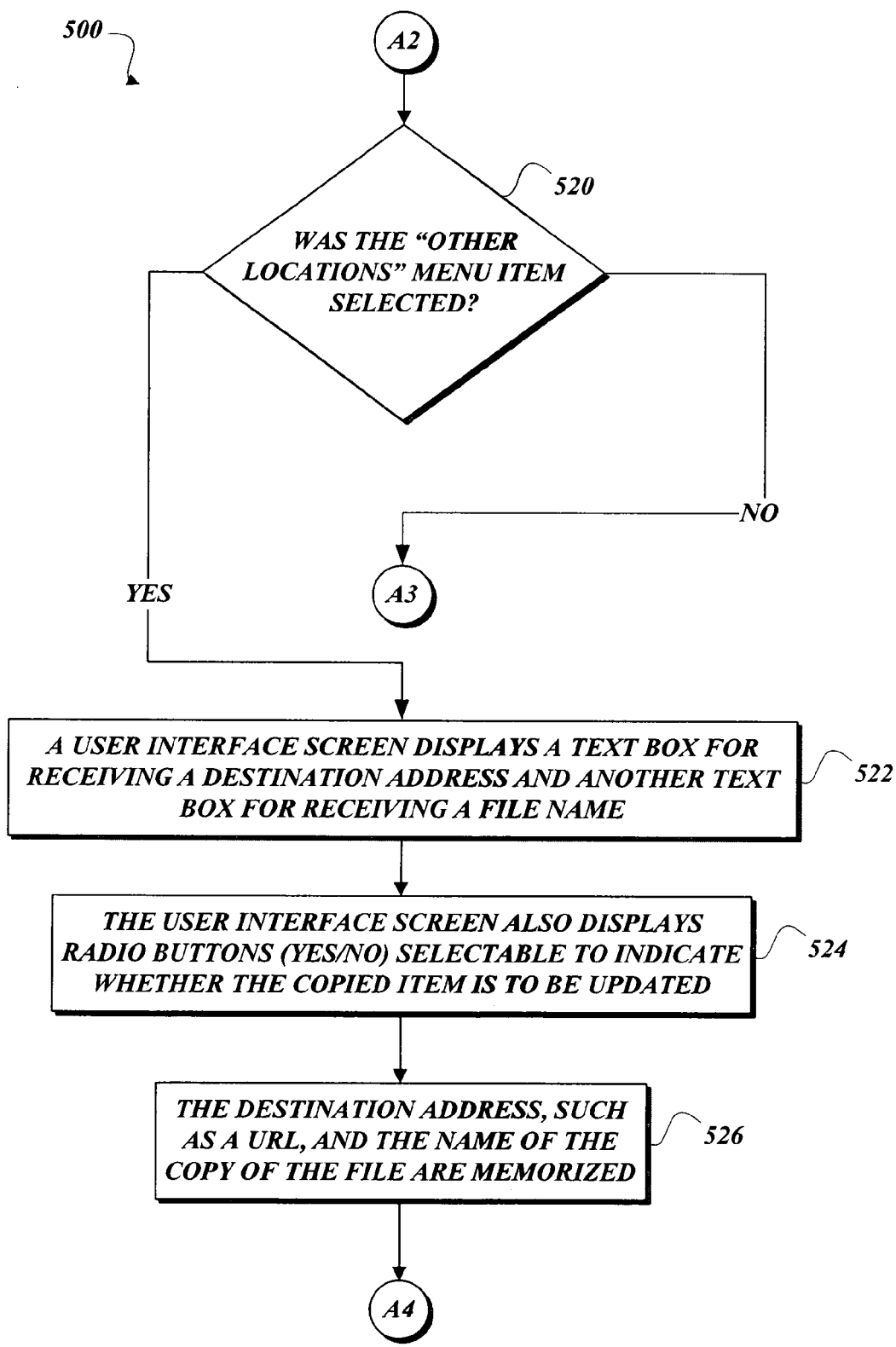
Figure 5D:
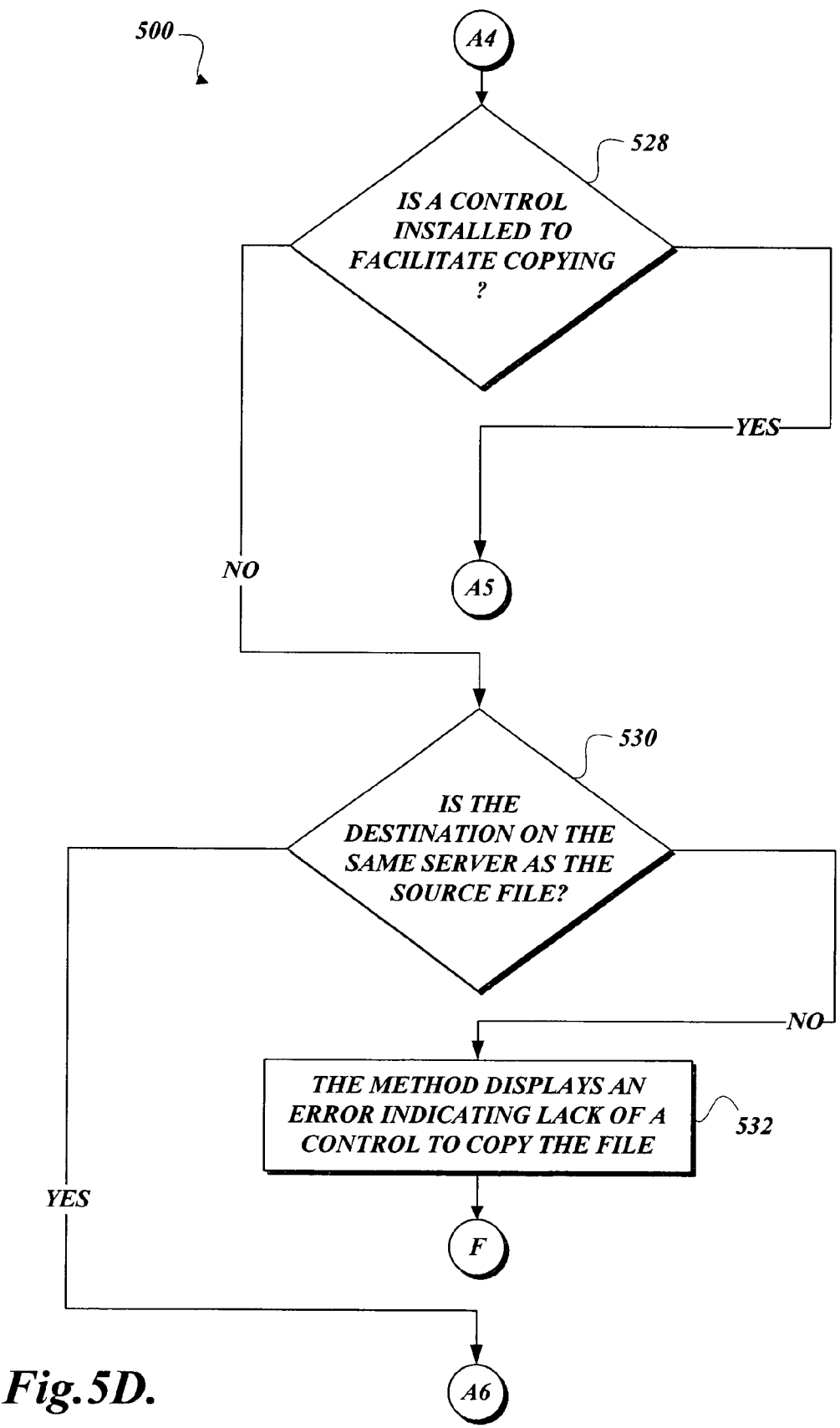
Figure 5E:
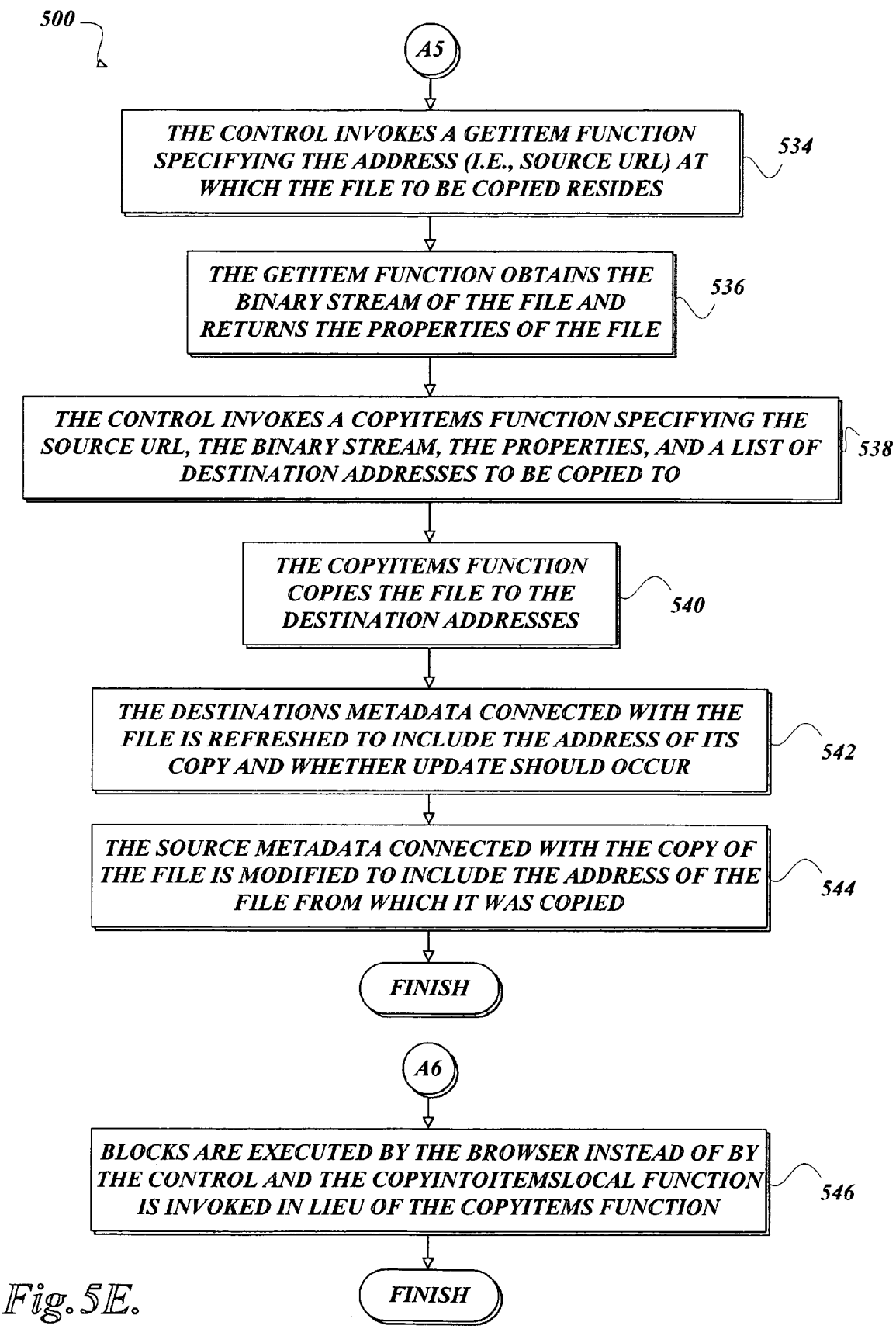

FIG. 4B illustrates a schema 416 that contains destination addresses at which copies of a file were made. The schema 416 can be formed from any suitable language. One suitable language includes a customizable, tag-based language, such as XML. A tag <copy destinations> 418 indicates the beginning of one or more tags that specify one or more tags that specify the destination addresses of various copies of a file. A tag <copydest> 420 includes an attribute URL that contains an address where a copy of the file bebop.doc may be found, such as "http://office.bebop.doc". The tag 420 also includes an attribute update as defined on line 422. The attribute update can either be false or true depending on whether automatic update is to be migrated to the copy of the file. Line 424 describes another attribute ModifiedBy, which contains the name or e-mail address of the person who created the copy of the file. The attribute ModifiedBy reveals who made a copy of the file.

FIGS. 5A-5E illustrate a method 500 for copying files. From a start block, the method 500 proceeds to block 502 where a cursor is hovered over a file to be copied and a context menu is invoked. Next, at block 504, the Send-To menu item is selected causing another menu to fly out from the Send-To menu item. The fly-out menu displays menu items that can be classified into three categories: suggested destinations, multiple copies, and other locations. See block 506. Next, the method 500 proceeds to decision block 508 where a test is performed to determine whether the suggested destinations menu item was selected. If the answer to the test at decision block 508 is no, the method 500 proceeds to a continuation terminal ("Terminal A1"). If the answer to the test at decision block 508 is yes, the rest of the file, such as a uniform resource locator, is memorized. See block 510. The method 500 then continues to another continuation terminal ("Terminal A4").

From Terminal A1 (FIG. 5B), the method 500 proceeds to decision block 512 where a test is performed to determine whether the multiple copies menu item was selected. If the answer to the test at decision block 512 is no, the method 500 continues to another continuation terminal ("Terminal A2"). Otherwise, if the answer to the test at decision block 512 is yes, the method 500 proceeds to block 514 where a user interface screen displays check boxes next to locations of copies of the file. Next, at block 516, check boxes next to locations of the copy of the file that have to be updated are selected. The addresses, such as the URLs of the locations of copies of the file that have to be updated, are memorized. See block 518. The method 500 then continues to Terminal A4.

From Terminal A2 (FIG. 5C), the method 500 proceeds to decision block 520 where a test is performed to determine whether another locations menu item was selected. If the answer to the test at decision block 520 is no, the method 500 continues to another continuation terminal ("Terminal A3"). If the answer to the test at decision block 520 is yes, the method 500 proceeds to block 522 where a user interface screen displays a text box for receiving a destination address and another text box for receiving a file name. The user interface screen also displays radio buttons (Yes/No) selectable to indicate whether the copied item is to be updated. See block 524. At block 526, the destination address, such as a URL, and the name of the copy of the file are memorized. The method 500 then continues to Terminal A4.

From Terminal A4 (FIG. 5D), the method 500 proceeds to decision block 528 where a test is performed to determine whether a control is installed to facilitate copying. If the answer to the test at decision block 528 is yes, the method 500 proceeds to another continuation terminal ("Terminal A5"). If the answer to the test at decision block 528 is no, another test is performed at decision block 530 to determine whether the destination address is on the same server or namespace as the source file. If the answer to the test at decision block 530 is no, the method 500 displays an error indicating lack of a control to copy the file. See block 532. The method 500 then terminates execution. If the answer to the test at decision block 530 is yes, the method continues to another continuation terminal ("Terminal A6").

From Terminal A5 (FIG. 5E), the method 500 proceeds to block 534 where the control invokes a GetItem function specifying the address (i.e., source URL) at which the file to be copied resides. At block 536, the GetItem function obtains the binary stream of the file and returns the properties of the file. The control invokes a CopyItems function specifying the source URL, the binary stream, the properties, and a list of destination addresses to be copied. See block 538. Next at block 540, the CopyItems function copies the file to the destination addresses. The destination's metadata connected with the file is refreshed to include the address of its copy and whether updating should occur. See block 542. The source metadata connected with the copy of the file is modified to include the address of the file from which it was copied. See block 544. The method 500 then terminates execution. From Terminal A6 (FIG. 5E), the method 500 proceeds to block 546 where blocks 534-544 are executed by the browser instead of by the control and the CopyIntoItemsLocal function is invoked in lieu of the CopyItems function. Block 546 is executed when a file is to be copied into the same namespace containing the file. In such a situation, it is inefficient to transfer bits and so instead, a reference is used to obtain the binary stream of the file without having to duplicate the entire binary stream and then reproduce it at another location.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for updating copies of files, comprising:
   receiving one or more events that indicate an act of hovering a pointer over a file to invoke a context menu, the context menu displaying a menu option to send a copy of the file to an address; in response to receiving one or more events that indicate an act of selecting the menu option, displaying a fly-out menu comprising a first menu item to copy the file to a destination and a second menu to update a plurality of existing copies of the file;
   in response to receiving one or more events that indicate an act of selecting the first menu item, displaying a window comprising a first text box adapted to receive a new address for storing a new copy of the file, a second text box adapted to receive a name for the new copy of the file, an item for selecting whether the file is to receive updates, and an item for selecting whether an alert is sent to a user when an update for the file is available;
   storing the new copy of the file at the new address; and
   storing the new address in association with an indication of whether the copy of the file is to receive updates;
   in response to receiving one or more events that indicate an act of selecting the second menu item, displaying a window comprising a plurality of addresses that correspond to the plurality of existing copies of the file;
   receiving one or more events that indicate an act of selecting at least two of the plurality of addresses;
   updating copies of the file corresponding to the at least two of the plurality of addresses.

2. The method of claim 1, further comprising displaying a window comprising namespaces corresponding to the at least two of the plurality of addresses.

3. The method of claim 2 wherein the window comprising the plurality of addresses that correspond to the plurality of existing copies of the files further comprises a button that is selectable to perform the updating and another button that is selectable to terminate the updating.

4. The method of claim 1, further comprising displaying a window comprising namespaces corresponding to the at least two of the plurality of addresses where one or more attempts have been tried to update the copies of the file corresponding to the at least two of the plurality of addresses, the window comprising the namespace further indicating whether the one or more attempts terminates successfully or terminates in failure, wherein the window comprising the namespaces further comprises a button that is selectable to indicate that updating shall be attempted again.

5. The method of claim 1, wherein the window comprising a plurality of addresses that correspond to the plurality of existing copies of the files further comprises an indication of whether each individual copy is to receive updates.

6. The method of claim 1, wherein the window comprising the plurality of addresses that correspond to the plurality of existing copies of the files further comprises a plurality of click boxes corresponding to the plurality of addresses, each of the plurality of click boxes being selectable.

* * * * *

UNITED STATES PATENT AND TRADEMARK OFFICE
CERTIFICATE OF CORRECTION

PATENT NO. : 7,490,300 B2  Page 1 of 1
APPLICATION NO. : 11/202999
DATED : March 16, 2009
INVENTOR(S) : Jason F. Morrill and Josef N. Larsson It is certified that error appears in the above-identified patent and that said Letters Patent is hereby corrected as shown below:

Column 8, lines 40: "the file" should read "the new copy of the file"

Column 8, line 45: "whether the copy of the file" should read "whether the new copy of the file"

Column 8, line 47: "the file" should read "the new copy of the file"

Column 9, line 6: "a plurality of addresses" should read "the plurality of addresses"

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,490,300 B2
APPLICATION NO. : 11/202999
DATED : February 10, 2009
INVENTOR(S) : Jason F. Morrill and Josef N. Larsson Page 1 of 1

It is certified that error appears in the above-identified patent and that said Letters Patent is hereby corrected as shown below:

Column 8, lines 40: "the file" should read "the new copy of the file"

Column 8, line 45: "whether the copy of the file" should read "whether the new copy of the file"

Column 8, line 47: "the file" should read "the new copy of the file"

Column 9, line 6: "a plurality of addresses" should read "the plurality of addresses"

This certificate supersedes the Certificate of Correction issued April 21, 2009.

Signed and Sealed this

Twelfth Day of May, 2009

JOHN DOLL
*Acting Director of the United States Patent and Trademark Office*